(12) United States Patent
Fujita et al.

(10) Patent No.: US 7,295,359 B2
(45) Date of Patent: Nov. 13, 2007

(54) LIGHT BEAM SCANNER AND IMAGE FORMING APPARATUS

(75) Inventors: Hirokazu Fujita, Nara (JP); Atsushi Ueda, Nara (JP); Yasuhiro Ono, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 86 days.

(21) Appl. No.: 11/093,300

(22) Filed: Mar. 30, 2005

(65) Prior Publication Data

US 2005/0219672 A1  Oct. 6, 2005

(30) Foreign Application Priority Data

Mar. 31, 2004  (JP)  ............................. 2004-105749

(51) Int. Cl.
*G02B 26/08* (2006.01)
(52) U.S. Cl. ...................... 359/204; 359/212; 347/243; 347/244; 347/232; 347/233
(58) Field of Classification Search ................ 359/204, 359/212; 347/243, 259, 260, 261, 115, 116
See application file for complete search history.

(56) References Cited

U.S. PATENT DOCUMENTS

| | | | | |
|---|---|---|---|---|
| 5,754,214 A | * | 5/1998 | Okino | ........................ 347/229 |
| 5,969,843 A | * | 10/1999 | Naiki et al. | .................. 359/196 |
| 6,683,708 B2 | * | 1/2004 | Shiraishi et al. | ............. 359/212 |
| 6,873,445 B2 | * | 3/2005 | Shiraishi | ..................... 359/204 |
| 2001/0026392 A1 | * | 10/2001 | Hama et al. | ................ 359/204 |
| 2002/0021351 A1 | * | 2/2002 | Shinohara et al. | .......... 347/235 |
| 2004/0032632 A1 | * | 2/2004 | Inagaki | ....................... 359/212 |

FOREIGN PATENT DOCUMENTS

| | | |
|---|---|---|
| JP | 63-9361 A | 1/1988 |
| JP | 2000-347116 A | 12/2000 |

* cited by examiner

*Primary Examiner*—Scott J. Sugarman
*Assistant Examiner*—Michael P Roberts
(74) *Attorney, Agent, or Firm*—Birch, Stewart, Kolasch & Birch, LLP

(57) ABSTRACT

A light beam scanner irradiates surfaces of respective of different image carriers with respective of plural light beams having been subjected to constant angular velocity deflection by a deflecting member and constant velocity deflection by a transformation member. Any one of the plural light beams except a light beam incident on the deflecting member at a widest incident angle corresponds with an image formed of a color material which is lowest in lightness.

7 Claims, 13 Drawing Sheets

LIGHT BEAM SCANNER AND IMAGE FORMING APPARATUS

CROSS REFERENCE

This Nonprovisional application claims priority under 35 U.S.C. § 119(a) on Patent Application No. 2004-105749 filed in Japan on Mar. 31, 2004, the entire contents of which are hereby incorporated by reference.

BACKGROUND OF THE INVENTION

The present invention relates to a light beam scanner for use in image forming apparatus such as a printer, facsimile apparatus and a copier. The invention also relates to an image forming apparatus provided with such a light beam scanner.

An image forming apparatus, such as a copier or a printer, includes a light beam scanner configured to scan the surface of an image carrier which is uniformly electrostatically charged in advance by static charger means with image-forming light, for example, laser beam modulated in accordance with signals based on image data.

Light beam scanners of the laser beam type adaptable to an increase in scanning speed are frequently used in such image forming apparatus because such a scanner exhibits a high modulating rate in modulating light into image-forming light in accordance with image data.

Conventionally, an image forming apparatus for color image formation has been provided with individual light beam scanners for respective elementary colors of a color image. However, the provision of plural light beam scanners in an image forming apparatus does not meet the demand for reduction in apparatus size and price.

In attempt to overcome this inconvenience, a light beam scanner has been developed having a configuration wherein a single polygonal mirror deflects plural light beams emitted from light sources provided for respective elementary colors in the primary scanning direction at constant angular velocity and the light beams thus deflected are further deflected at a constant velocity by a single transformation means and then separated from each other toward respective elementary color image carriers, as disclosed in Japanese Patent Application Laid-Open Nos. S63-009361 A and 2000-347116 for example.

In deflecting plural light beams at constant angular velocity at a time by causing the plural light beams to become incident on the same surface of the polygonal mirror, further deflecting the plural light beams at a constant velocity by the transformation means and then separating the light beams from each other by reflecting members, it is required that the plural light beams become incident on the reflective surface of the polygonal mirror at different incident angles in the secondary scanning direction.

However, if a light beam is caused to become incident on a reflective surface of the polygonal mirror at an angle in the secondary scanning direction, a scanning line formed by the light beam deflected with rotation of the polygonal mirror becomes curved. This phenomenon is generally called "bow". The curvature of such a bow increases with increasing incident angle of a light beam on the polygonal mirror in the secondary scanning direction. Light beams incident on the polygonal mirror from opposite sides of a primary optical axis plane will form respective scanning lines curved in different directions after deflection by the polygonal mirror. The primary optical axis plane is perpendicular to a reflective surface of the polygonal mirror and, hence, light passing in the primary optical axis plane becomes incident on the reflective surface at an incident angle of 0°. Accordingly, light beams incident on the reflective surface of the polygonal mirror from opposite sides of the primary optical axis plane form scanning lines curved in opposite directions. Thus, the resulting scanning lines deviate largely from each other, which will cause a color drift to occur in a color image forming apparatus. Such a color drift raises a problem of considerably degraded image quality.

A feature of the present invention is to provide a light beam scanner capable of decreasing an error in the secondary scanning direction in forming scanning lines with plural light beams. Another feature of the present invention is to provide an image forming apparatus provided with such a light beam scanner.

SUMMARY OF THE INVENTION

According to the present invention, there is provided a light beam scanner comprising: a single deflecting member configured to deflect plural light beams at constant angular velocity, the plural light beams being incident on a reflective surface of the deflecting member at different incident angles in a secondary scanning direction and corresponding with respective of images formed of respective color materials which are different in lightness from each other; a transformation member configured to deflect the plural light beams thus deflected by the deflecting member at a constant velocity; and separating members arranged to separate the plural light beams thus deflected by the transformation member from each other in respective directions toward surfaces of respectively different image carriers, wherein any one of the plural light beams except a light beam incident on the deflecting member at a widest incident angle of the different incident angles corresponds to an image formed of a color material which is lowest in lightness of the color materials.

The foregoing and other features and attendant advantages of the present invention will become more apparent from the reading of the following detailed description of the invention in conjunction with the accompanying drawings.

DETAILED DESCRIPTION OF THE INVENTION

The present invention will now be described in detail with reference to the accompanying drawings.

Figure 1:
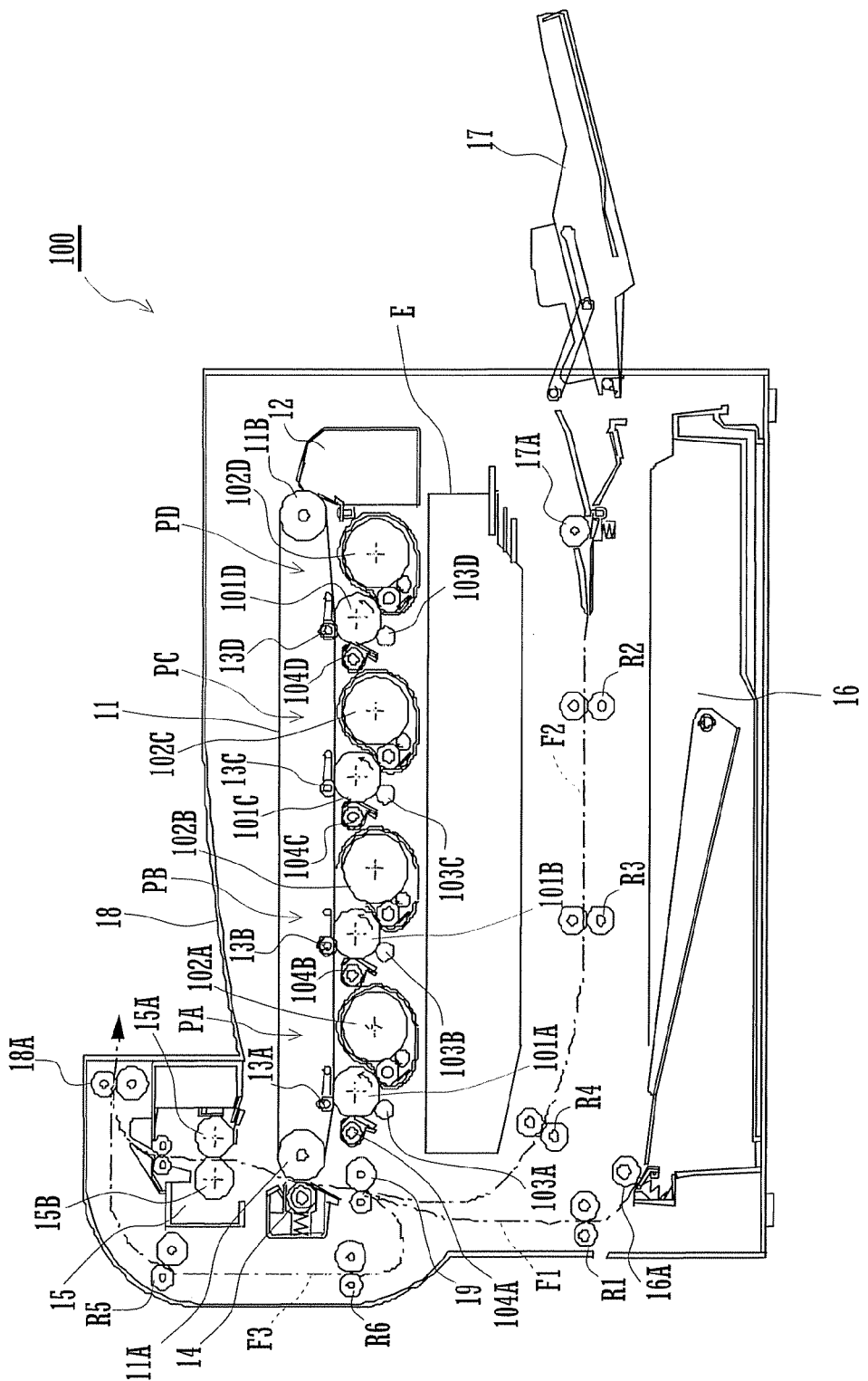
FIG. 1 is a schematic view showing the construction of an image forming apparatus provided with a light beam scanner according to one embodiment of the present invention.

Referring first to FIG. 1, an image forming apparatus 100 selectively forms a multi-color or monochromatic image on a recording medium, such as a recording sheet, according to image data transmitted from outside. For this purpose the image forming apparatus 100 includes exposure unit (corresponding to the light beam scanner defined by the present invention) E, photosensitive drums (corresponding to the image carriers defined by the present invention) 101A to 101D, developing units 102A to 102D, charger rollers 103A to 103D, cleaning units 104A to 104D, intermediate transfer belt 11, primary transfer rollers 13A to 13D, secondary transfer roller 14, fixing device 15, sheet feed paths F1, F2 and F3, sheet feed cassette 16, manual feed tray 17, ejected sheet tray 18, and other components.

The image forming apparatus 100 performs image formation using image data items corresponding with four colors including black (K) in addition to the three subtractive primary colors, i.e., cyan (C), magenta (M) and yellow (Y), which are obtained by color separation of a full-color image. The photosensitive drum 101A, developing unit 102A, charger roller 103A, primary transfer roller 13A and cleaning unit 104A constitute an image forming section PA. Image forming sections PB to PD are each constituted similarly to the image forming section PA. The image forming sections PA to PD are arranged in a row in the direction of movement of the intermediate transfer belt 11 (i.e., the secondary scanning direction.)

Each of the charger rollers 103A to 103D is a contact type static charger configured to electrostatically charge the surface of the associated one of the photosensitive drums 101A to 101D to a predetermined potential uniformly. Instead of the charger rollers 103A to 103D, it is possible to use contact type chargers each employing a charger brush or non-contact type charger devices each employing a static charger. The exposure unit E, which includes semiconductor lasers, a polygonal mirror, a reflecting mirror and other components, irradiates the photosensitive drums 101A to 101D with respective laser beams modulated according to image data items corresponding with respective of the colors, i.e., black, cyan, magenta and yellow. Thus, the surfaces of photosensitive drums 101A to 101D become formed with respective electro static latent images (or, merely latent images) according to the image data items corresponding with respective of black, cyan, magenta and yellow.

Each of the developing units 102A to 102D supplies developer (corresponding to a color material defined by the present invention) to the surface of the associated one of the photosensitive drums 101A to 101D formed with a respective one of the latent images to turn the latent image into a visible toner image. The developing units 102A to 102D have stored therein a black developer, a cyan developer, a magenta developer and a yellow developer, respectively, for developing the latent images formed on the respective photosensitive drums 101A to 101D into a black toner image, a cyan toner image, a magenta toner image and a yellow toner image, respectively. Each of the cleaning units 104A to 104D removes and collects residual toner which remains on the surface of the associated one of the photosensitive drums 101A to 101D after the development and transfer process has been completed.

The intermediate transfer belt 11 is entrained about a driving roller 11A and a driven roller 11B to form a looped path of movement. The intermediate transfer belt 11 has an outer peripheral surface coming to face the photosensitive drums in the order of 101D, 101C, 101B and 101A. The primary transfer rollers 13A to 13D are opposed to the photosensitive drums 101A to 101D, respectively, across the intermediate transfer belt 11. The primary transfer rollers 13A to 13D are applied with transfer bias of a polarity opposite to the polarity of electrostatically charged toner. By the primary transfer rollers 13A to 13D thus applied with such transfer bias, the toner images of the respective colors formed on the respective photosensitive drums 101A to 101D are sequentially transferred to an outer peripheral surface of the intermediate transfer belt 11 so as to be superimposed on each other, thereby forming a full-color toner image on the outer peripheral surface of the intermediate transfer belt 11.

If image data items corresponding with only some of the colors, i.e., yellow, magenta, cyan and black, are inputted, only those drums of the four photosensitive drums 101A to 101D which correspond with the colors corresponding with the inputted image data items are to be formed with respective latent images and then respective toner images. In monochromatic image formation for example, only the photosensitive drum 101A corresponding with black is to be formed with a latent image and then a black toner image, followed by transfer of only the black toner image to the outer peripheral surface of the intermediate transfer belt 11.

The primary transfer rollers 13A to 13D each comprise a metal shaft (of stainless steel for example) having a diameter of 8 to 10 mm and an electrically conductive resilient member (of EPDM, i.e. Ethylene Propylene Diene Methylene Linkage, or foamed urethane for example) covering the surface of the shaft. The intermediate transfer belt 11 can be uniformly applied with a high voltage through the electrically conductive resilient member. Instead of the primary transfer rollers 13A to 13D, brush-shaped primary transfer members may be used.

The toner image thus formed on the outer peripheral surface of the intermediate transfer belt 11 is transported by revolution of the intermediate transfer belt 11 to a position opposite to the secondary transfer roller 14. During image formation the secondary transfer roller 14 is pressed against the outer peripheral surface of the intermediate transfer belt 11 at a predetermined nip pressure. The secondary transfer roller 14 is applied with a high voltage of a polarity opposite to the polarity of charged toner during passage of a recording sheet fed from the sheet feed cassette 16 or the manual feed tray 17 between the secondary transfer roller 14 and the intermediate transfer belt 11. This operation causes the toner image to be transferred from the outer peripheral surface of the intermediate transfer belt 11 to a surface of the recording sheet.

For the nip pressure between the secondary transfer roller 14 and the intermediate transfer belt 11 to be kept at the predetermined value, one of the secondary transfer roller 14 and the driving roller 11A is formed of a hard material (such as a metal), while the other is formed of a soft material such as a resilient roller (for example resilient rubber roller or foamed resin roller).

Of the toner attracted to the intermediate transfer belt 11 from the photosensitive drums 101A to 101D, residual toner fractions that remain on the intermediate transfer belt 11 without having been transferred to the recording sheet are collected by the cleaning unit 12 to avoid color mixture in the succeeding process.

The recording sheet bearing the toner image transferred thereto is guided to the fixing device 15 where the recording sheet is subjected to heat and pressure during its passage between a heating roller 15A and a pressure roller 15B. This operation allows the toner image to be firmly fixed to the surface of the recording sheet. The recording sheet bearing the toner image thus fixed thereto is ejected by ejection rollers 18A onto the ejected sheet tray 18.

The image forming apparatus 100 defines a substantially vertical sheet feed path F1 for transporting each of the recording sheets held in the sheet feed cassette 16 to the ejected sheet tray 18 by passing the recording sheet between the secondary transfer roller 14 and the intermediate transfer belt 11 and through the fixing device 15. The sheet feed path F1 is provided with a pickup roller 16A operative to pay out the recording sheets held in the sheet feed cassette 16 into the sheet feed path F1 one by one, transport rollers R5 and R6 are operative to transport each of the paid-out recording sheets upwardly, registration rollers 19 operative to guide each transported recording sheet to between the secondary transfer roller 14 and the intermediate transfer belt 11 with predetermined timing, and the ejection rollers 18A operative to eject each recording sheet onto the ejected sheet tray 18.

Also, the image forming apparatus 100 internally defines a sheet feed path F2 which extends from the manual feed tray 17 to the registration rollers 19 and which is provided with a pickup roller 17A and transport rollers R2 to R4. Further, the image forming apparatus 100 defines a sheet feed path F3 extending from the ejection rollers 18A to the upstream side of the registration rollers 19 in the sheet feed path F1.

The ejection rollers 18A are forwardly and backwardly rotatable. The ejection rollers 18A are rotated forwardly to eject a recording sheet onto the ejected sheet tray 18 in a one-side image formation mode in which an image is formed on one side of a recording sheet or during a second side image forming operation in a double-side image formation mode in which images are formed on the both sides of a recording sheet. During a first side image forming operation in the double-side image formation mode, on the other hand, the ejection rollers 18A are rotated forwardly until the trailing edge of a recording sheet has passed through the fixing device 15 and then driven backwardly with the trailing edge of the recording sheet caught therebetween to guide the recording sheet into the sheet feed path F3. This operation causes the recording sheet bearing an image on one side thereof to be turned upside down and front side back and guided to the sheet feed path F1.

The registration rollers 19 guide a recording sheet fed thereto from the sheet feed cassette 16 or the manual feed tray 17 or through the sheet feed path F3 to a position between the secondary transfer roller 14 and the intermediate transfer belt 11 in synchronization with revolution of the intermediate transfer belt 11. For this purpose, the registration rollers 19 stop rotating in the beginning of the operation of the photosensitive drums 101A to 101D and the intermediate transfer belt 11 and, therefore, a recording sheet fed or transported prior to the revolution of the intermediate transfer belt 11 stops traveling on the sheet feed path F1 with its front or leading edge abutting against the registration rollers 19. Thereafter, the registration rollers 19 start rotating with such timing as to register the leading edge of the recording sheet with the leading edge of a toner image on the intermediate transfer belt 11 at the location where the secondary transfer roller 14 presses against the intermediate transfer belt 11.

Though the present embodiment is described by reference to the image forming apparatus 100 employing the intermediate transfer belt 11, it is needless to say that the present invention is applicable to image forming apparatus of the type configured to perform color image formation by transferring images formed on plural photosensitive drums directly to a recording sheet carried on a transfer belt while superimposing one image upon another.

Figure 2:
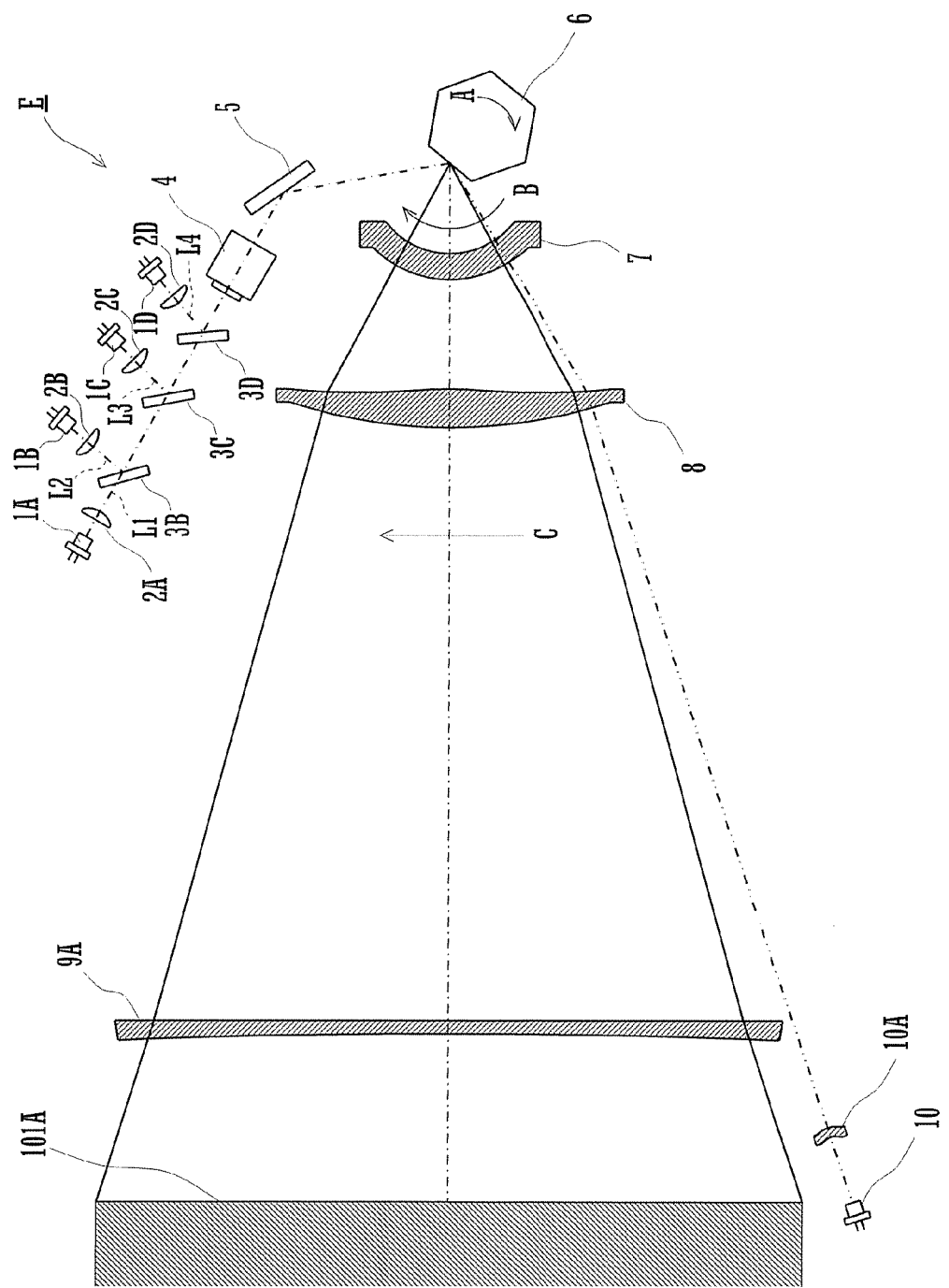
FIG. 2 is a schematic plan view showing the structure of an exposure unit as the light beam scanner according to the embodiment.
Figure 3:
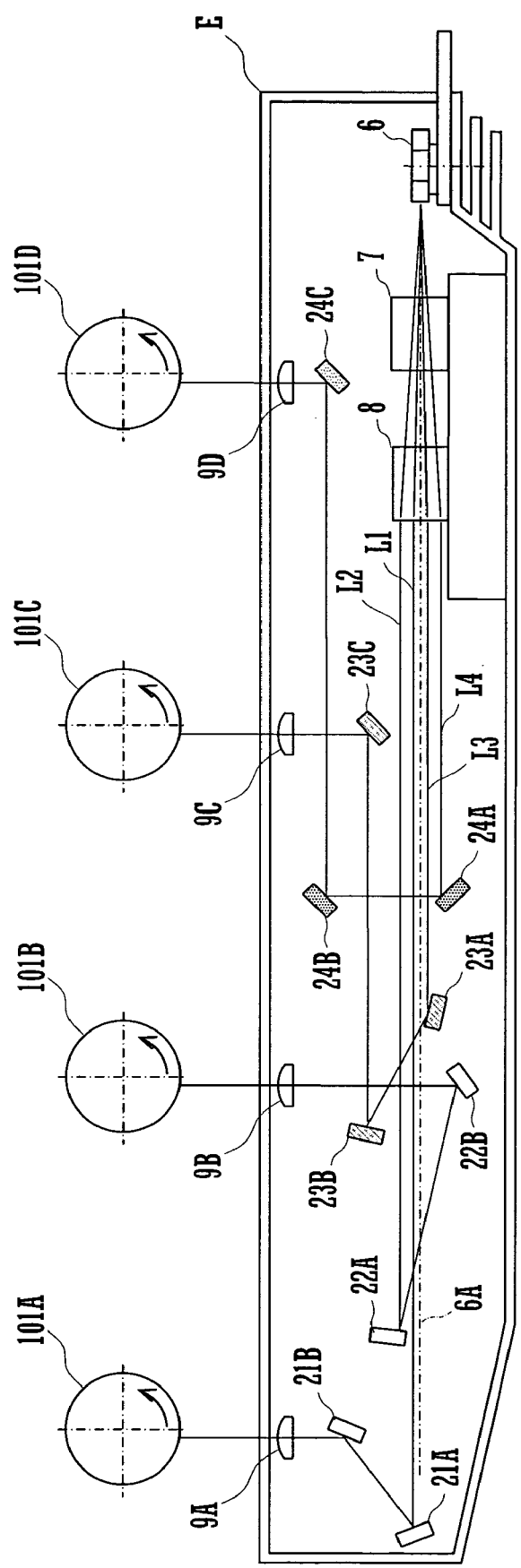
FIG. 3 is a schematic front elevational view showing the structure of the exposure unit as the light beam scanner according to the embodiment.

Referring to FIGS. 2 and 3, the exposure unit E includes semiconductor lasers 1A to 1D, collimator lenses 2A to 2D, half mirrors 3B to 3D, first cylindrical lens 4, polygonal mirror 6, first Fθ lens 7, second Fθ lens 8, second cylindrical lenses 9A to 9D (only the second cylindrical lens 9A shown in FIG. 2), mirrors 21 to 24, synchronizing lens 10A, and BD (beam detector) sensor 10.

The semiconductor lasers 1A to 1D emit laser beams L1 to L4, respectively. The laser beams L1 to L4 are modulated in accordance with a black image data item, cyan image data item, magenta image data item and yellow image data item, respectively. Thus, the laser beams L1 to L4 correspond with respective of images formed of respective color materials which are different in lightness from each other. The laser beams L1 to L4 correspond to the plural light beams defined by the present invention. The laser beams L1 to L4, which are diffused light beams emitted from semiconductor lasers 1A to 1D, respectively, are guided by the collimator lenses 2A to 2D, half mirrors 3B to 3D, first cylindrical lens 4 and mirror 5 and become incident on a reflective surface of the polygonal mirror 6 at different incident angles in the secondary scanning direction.

The polygonal mirror 6, which corresponds to the deflecting member defined by the present invention, has six reflective surfaces for example. The polygonal mirror 6 rotates in the direction indicated by arrow A to deflect the laser beams L1 to L4 incident on each reflective surface thereof in the direction indicated by arrow B at constant angular velocity.

The first Fθ lens 7 and second Fθ lens 8, which constitute the transformation member defined by the present invention, further deflect each of the laser beams L1 to L4 having been deflected by the polygonal mirror 6 in the direction indicated by arrow C so that the laser beam scans the surface of the associated one of the photosensitive drums 101A to 101D at a constant velocity in the primary scanning direction parallel with the axis of the associated photosensitive drum. An example of the first Fθ lens 7 has aspheric surfaces constituting both its light-incoming side and light-outgoing side. An example of the second Fθ lens 8 has an aspheric surface constituting its light-incoming side and a free-form surface constituting its light-outgoing side.

The mirrors 21 to 24, which are reflecting members constituting the separating members defined by the present invention, separate the laser beams L1 to L4 from each other so that each of the laser beams L1 to L4 is distributed to the surface of the associated one of the photosensitive drums 101A to 101D. Each of the laser beams L1 to L4 having passed through the second Fθ lens 8 is guided to the associated one of the photosensitive drums 101A to 101D via the associated one of combinations of mirrors and second cylindrical lens, namely, mirrors 21 and second cylindrical lens 9A, mirrors 22 and second cylindrical lens 9B, mirrors 23 and second cylindrical lens 9C, and mirrors 24 and second cylindrical lens 9D. Thus, the laser beams L1 to L4 form respective images on the surfaces of the respective photosensitive drums 101A to 101D (of which only the photosensitive drum 101A is shown in FIG. 2).

The number of mirrors 21 to 24 may be varied appropriately as will be described later. While each of the first and second Fθ lenses 7 and 8 and second cylindrical lenses 9A to 9D comprises a molded product of resin in the present embodiment in view of its suitability for volume production, lenses of glass may be used instead.

The BD sensor 10 detects any one of laser beams L1 to L4 at a location outside an effective exposure region in the primary scanning direction. Any one of laser beams L1 to L4 reflected by a reflective surface of the polygonal mirror 6 becomes incident on the light-receiving surface of the BD sensor 10 through the synchronizing lens 10A in such a region extending in the primary scanning direction as to fail to allow the laser beam to reach the surface of the associated photosensitive drum 101. When the BD sensor 10 receives any one of laser beams L1 to L4, the BD sensor 10 outputs a signal for determining the timing with which modulation of each of laser beams L1 to L4 according to image data is to be started in the associated one of the semiconductor lasers 1A to 1D. In the present embodiment all the laser beams are reflected by the same reflective surface of the polygonal mirror 6 so as to be substantially superimposed on each other. For this reason the modulation start timing for all the laser beams can be controlled based on detection of a single laser beam. Further, the BD sensor 10 is adapted to detect laser beam L1 for forming a black image which has a smallest scanning line bow distortion and, therefore, high-precision detection can be realized.

Figure 4:
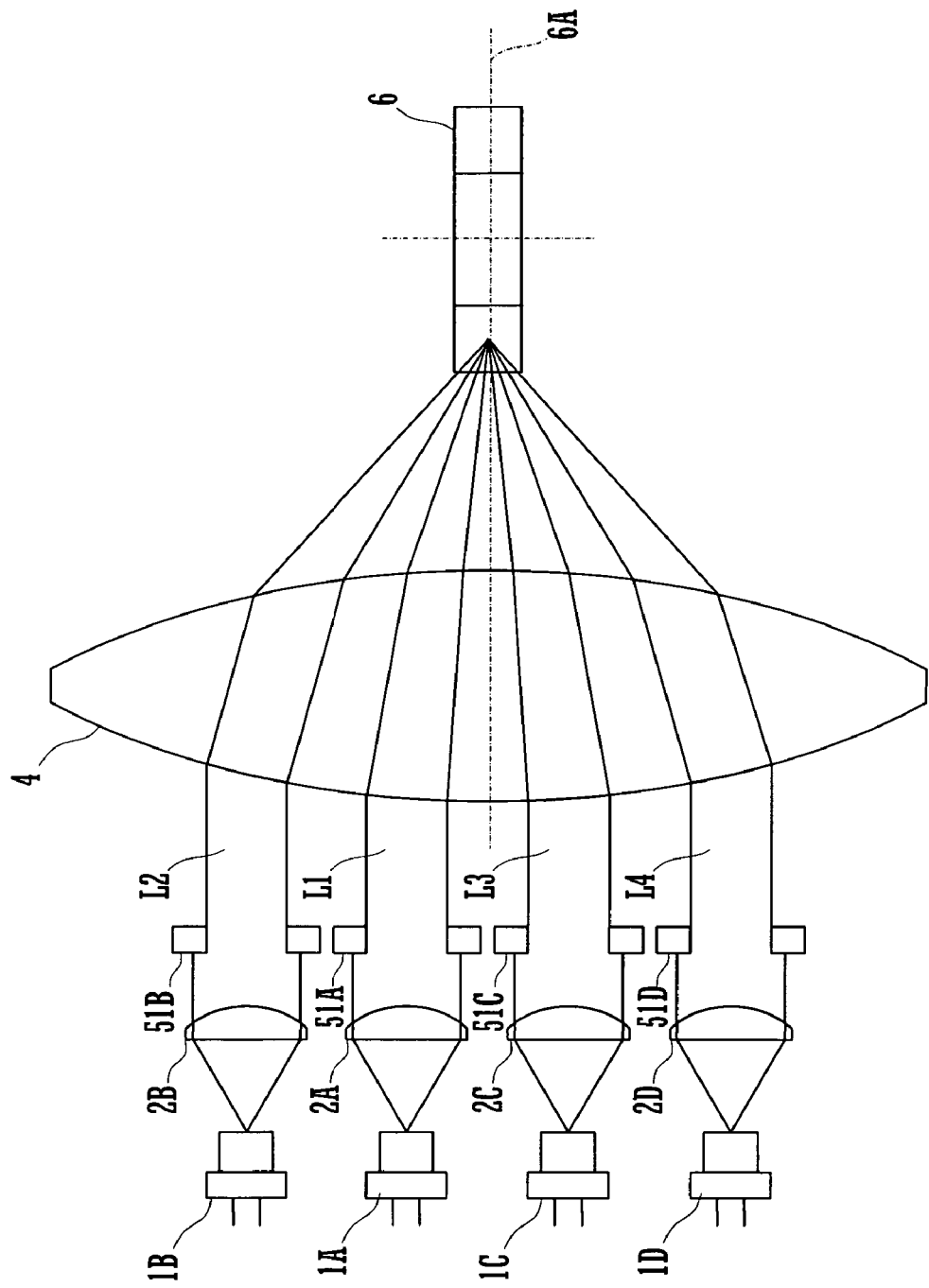
FIG. 4 is a view illustrating optical paths of laser beams incident on a polygonal mirror from respective semiconductor lasers in the exposure unit.
Figure 5:
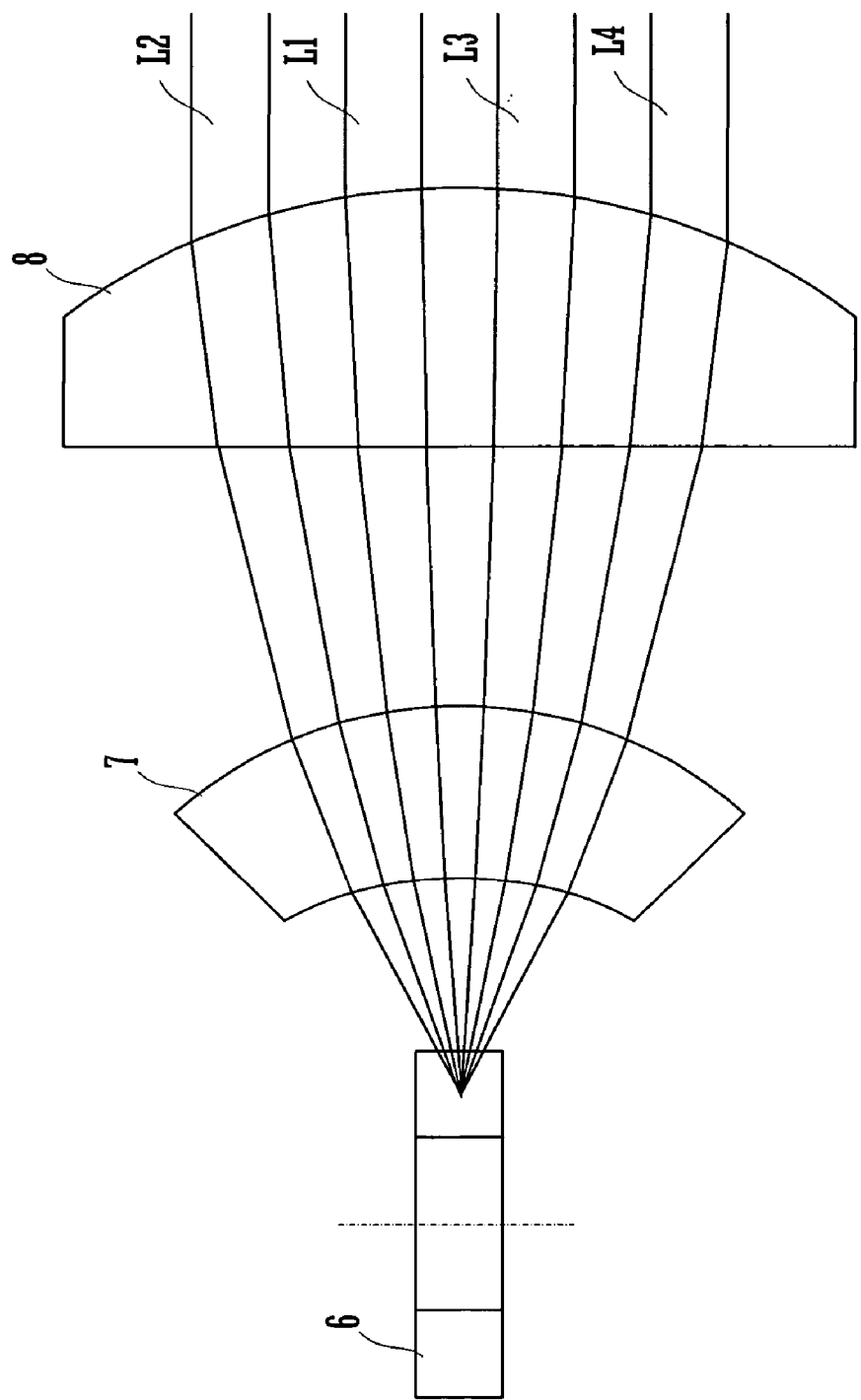
FIG. 5 is a view illustrating optical paths of laser beams from the polygonal mirror to a location short of reaching a second cylindrical lens in the exposure unit.

As shown in FIGS. 4 and 5, laser beams L1 to L4 emitted from the respective semiconductor lasers 1A to 1D are caused to become incident on the same reflective surface of the polygonal mirror 6 at different incident angles by the optical characteristics of the first cylindrical lens 4. In the case of FIG. 4, laser beam L1 corresponding with a black image and laser beam L2 corresponding with a cyan image become incident on the reflective surface of the polygonal mirror 6 from the upper side of the primary optical axis plane 6A perpendicular to the reflective surface of the polygonal mirror 6 while laser beam L3 corresponding with a magenta image and laser beam L4 corresponding with a yellow image become incident on the reflective surface of the polygonal mirror 6 from the lower side of the primary optical axis plane 6A.

Further, laser beams L1 to L4 become incident on the reflective surface of the polygonal mirror 6 so as to be superimposed on each other at least partially in both the primary scanning direction and the secondary scanning direction, whereby the laser beams are focused on the reflective surface in the secondary scanning direction. Preferably, all the laser beams L1 to L4 have to be completely superimposed on each other at the same reflective surface of the polygonal mirror 6.

Laser beams L1 to L4 emitted from the respective semiconductor lasers 1A to 1D are narrowed in the secondary scanning direction by apertures 51A to 51D associated with respective collimator lenses 2A to 2D.

The following description is directed to arrangements of optical paths of laser beams in the exposure unit E.

Figure 6A:
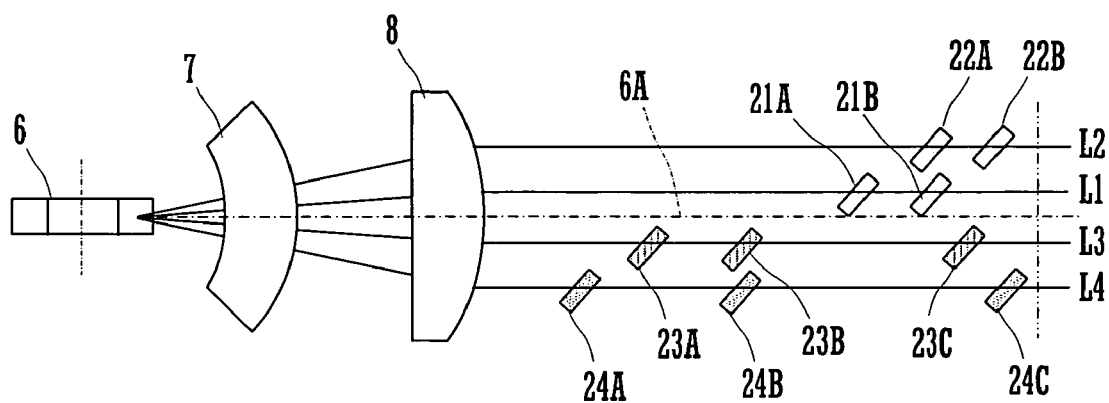
FIG. 6A is an illustration of a first arrangement of mirrors in a portion of optical paths of laser beams in the exposure unit.

In a first arrangement shown in FIG. 6A, laser beams L1 and L3 corresponding with respective of black and magenta, which are relatively low in lightness and relatively high in visibility, are caused to become incident on a reflective surface of the polygonal mirror 6 at smaller incident angles than laser beams L2 and L4 corresponding with respective of cyan and yellow, which are relatively high in lightness and relatively low in visibility. Specifically, laser beam L4 corresponding with yellow, which is highest in lightness of the four colors used in color image formation, is caused to become incident on the polygonal mirror 6 at the widest incident angle. Further, a pair of mirrors 21A and 21B and a pair of mirrors 22A and 22B are positioned in respective of the optical paths of laser beams L1 and L2 corresponding with respective of black and cyan which become incident on the polygonal mirror 6 from the upper side of the primary optical axis plane 6A, while a set of three mirrors 23A to 23C and a set of three mirrors 24A to 24C are positioned in respective of the optical paths of laser beams L3 and L4 corresponding with respective of magenta and yellow which become incident on the polygonal mirror 6 from the lower side of the primary optical axis plane 6A.

Figure 6B:
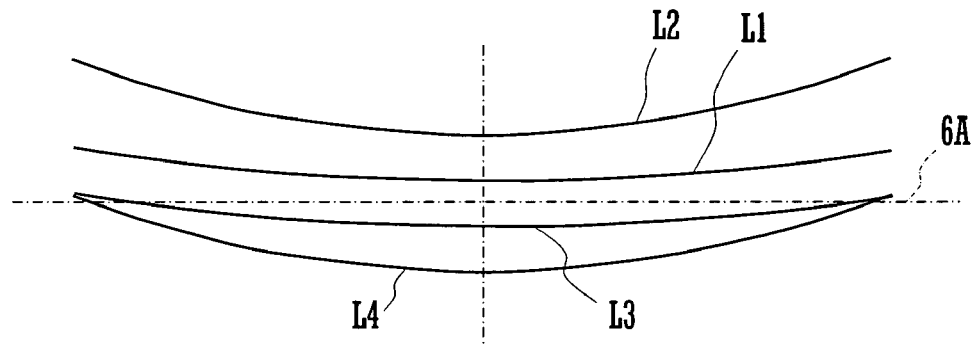
FIG. 6B is an illustration of curved states of respective laser beams passing from the mirrors in the first arrangement to respective photosensitive drums.

With this arrangement, laser beams L1 to L4 become curved in the same direction as shown in FIG. 6B. Further, laser beam L1 corresponding with black and laser beam L3 corresponding with magenta are caused to become incident on the polygonal mirror 6 at equal absolute values of incident angles. Likewise, laser beam L2 corresponding with cyan and laser beam L4 corresponding with yellow are made to become incident on the polygonal mirror 6 at equal absolute values of incident angles.

Figure 6C:
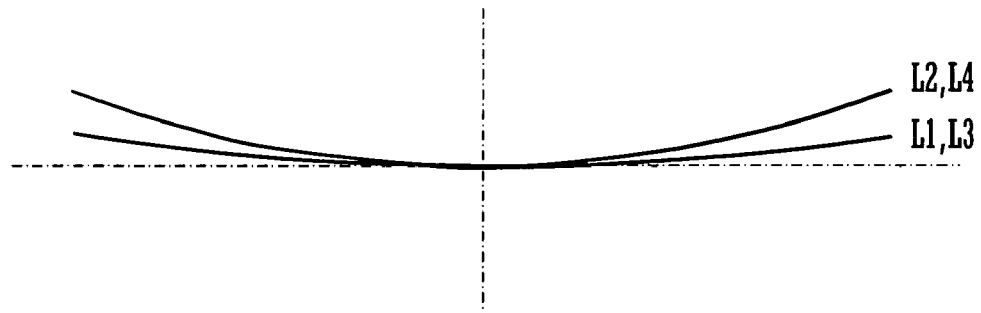
FIG. 6C is an illustration of a superimposed state of toner images formed on respective photosensitive drums by the laser beams having passed through the first arrangement of mirrors.

Accordingly, the relative scanning position of laser beam L1 corresponding with black on the photosensitive drum 101A and that of laser beam L3 corresponding with magenta on the photosensitive drum 101C become coincident with each other, while the relative scanning position of laser beam L2 corresponding with cyan on the photosensitive drum 101B and that of laser beam L4 corresponding with yellow on the photosensitive drum 101D become coincident with each other, as shown in FIG. 6C.

Thus, if the optical characteristics of lenses 7 to 9 are neglected, a color image comprising toner images of four colors is formed on the intermediate transfer belt 11 with each pair of two colors superimposed on each other precisely. The relative scanning line positions of laser beams L1 to L4 on respective ones of the photosensitive drums 101A to 101D are made to coincide with each other at a central portion of the primary scanning axis by adjusting either the modulation start timing with which modulation of each of laser beams L1 to L4 according to the associated one of the image data items corresponding with the four colors is to be started or the positions of the mirrors (namely, mirrors 21A and 21B, mirrors 22A and 22B, mirrors 23A to 23C and mirrors 24A to 24C). By so doing, relative scanning position errors of laser beams L1 to L4 can be minimized in the secondary scanning direction. In cases where cyan and magenta have little difference in lightness or where cyan is lower in lightness than magenta contrary to the present embodiment, an optical system may be formed in which laser beams L3 and L2 correspond with cyan and magenta, respectively.

Figure 7A:
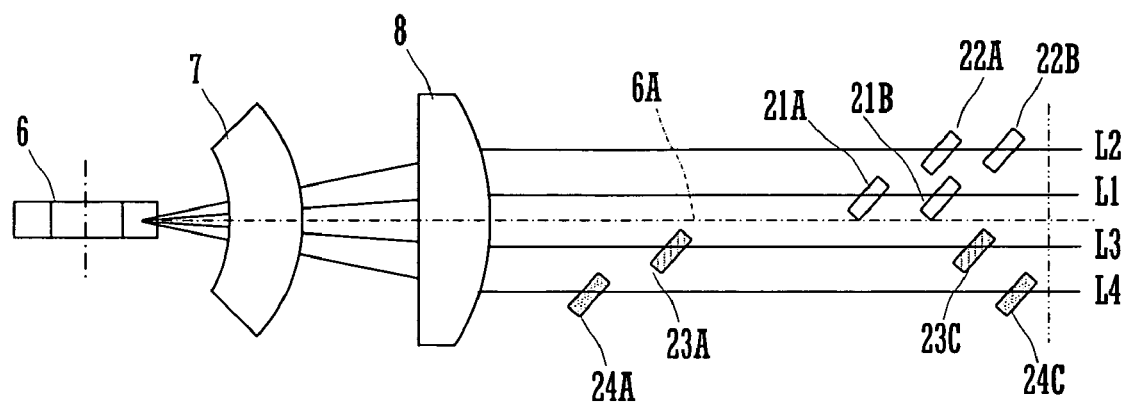
FIG. 7A is an illustration of a second arrangement of mirrors in a portion of optical paths of laser beams in the exposure unit.

In a second arrangement shown in FIG. 7A, laser beams L1 and L3 corresponding with black and magenta, respectively, which are relatively low in lightness and relatively high in visibility, are caused to become incident on a reflective surface of the polygonal mirror 6 at smaller incident angles than laser beams L2 and L4 corresponding with cyan and yellow, respectively, which are relatively high in lightness and relatively low in visibility.

Specifically, laser beam L4 corresponding with yellow, which is highest in lightness of the four colors used in color image formation, is caused to become incident on the polygonal mirror 6 at the widest incident angle. Further, a pair of mirrors 21A and 21B and a pair of mirrors 22A and 22B are positioned in respective ones of the optical paths of laser beams L1 and L2 corresponding with black and cyan, respectively, which become incident on the polygonal mirror 6 from the upper side of the primary optical axis plane 6A, while a pair of mirrors 23A and 23B and a pair of mirrors 24A and 24B are positioned in respective ones of the optical paths of laser beams L3 and L4 corresponding with magenta and yellow, respectively, which become incident on the polygonal mirror 6 from the lower side of the primary optical axis plane 6A.

Figure 7B:
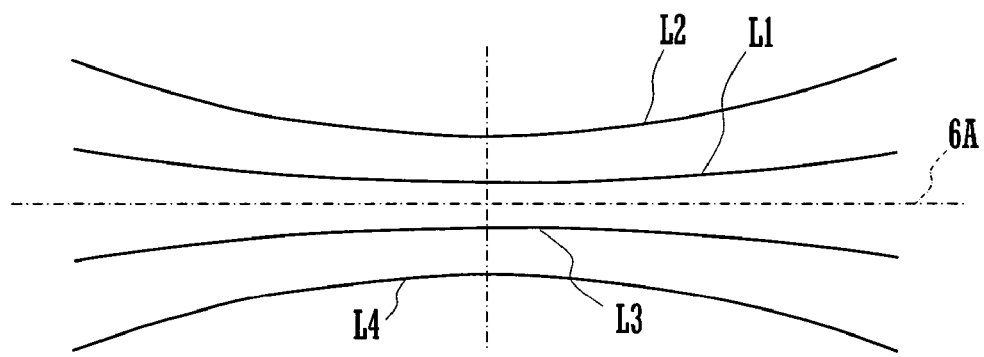
FIG. 7B is an illustration of curved states of respective laser beams passing from the mirrors in the second arrangement to respective photosensitive drums.
Figure 7C:
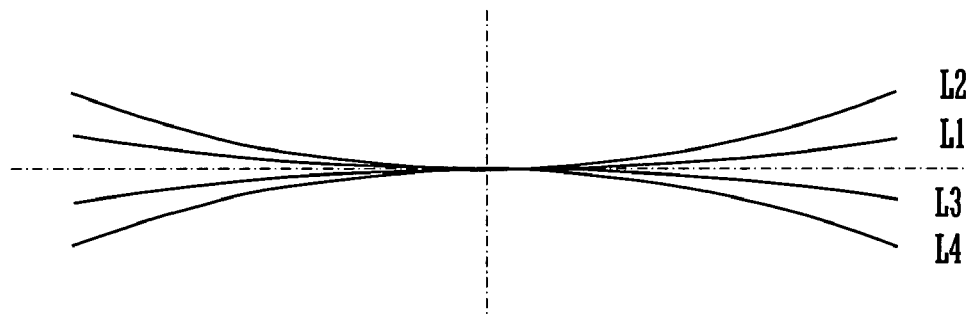
FIG. 7C is an illustration of a superimposed state of toner images formed on respective photosensitive drums by the laser beams having passed through the second arrangement of mirrors.

With this arrangement, laser beams L1 to L4 become curved so that the pair of laser beams L1 and L2 and the pair of laser beams L3 and L4 become symmetric with respect to the primary optical axis plane 6A, as shown in FIG. 7B. The relative scanning line positions of laser beams L1 to L4 on respective ones of the photosensitive drums 101A to 101D are made to coincide with each other at a central portion of the primary scanning axis by adjusting either the modulation start timing with which modulation of each of laser beams L1 to L4 according to the associated one of the image data items corresponding with the four colors is to be started or the positions of the mirrors (namely, mirrors 21A and 21B, mirrors 22A and 22B, mirrors 23A and 23B and mirrors 24A and 24B). By so doing, relative scanning position errors of laser beams L1 to L4 can be minimized in the secondary scanning direction as shown in FIG. 7C. In cases where cyan and magenta have little difference in lightness or where cyan is lower in lightness than magenta contrary to the present embodiment, an optical system may be formed in which laser beams 13 and L2 correspond with cyan and magenta, respectively.

Figure 8A:
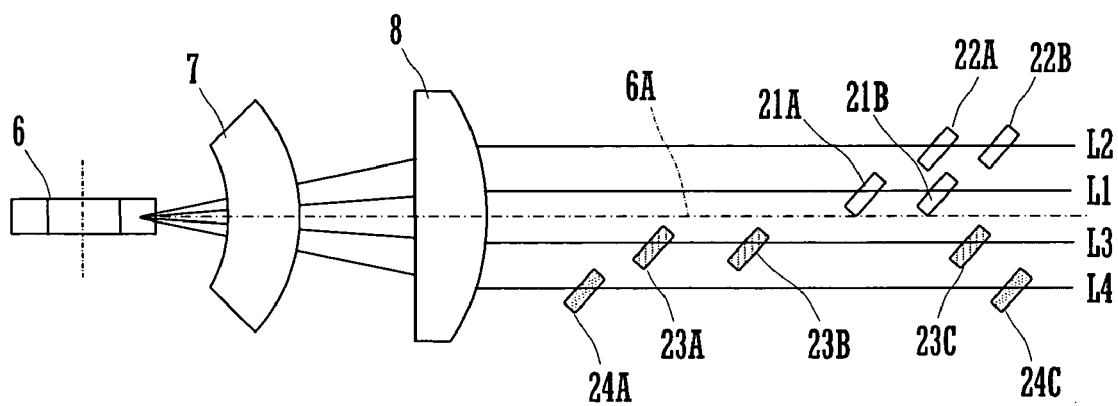
FIG. 8A is an illustration of a third arrangement of mirrors in a portion of optical paths of laser beams in the exposure unit.

In a third arrangement shown in FIG. 8A, laser beams L1 and L3 corresponding with black and magenta, respectively, which are relatively low in lightness and relatively high in visibility, are caused to become incident on a reflective surface of the polygonal mirror 6 at smaller incident angles than laser beams L2 and L4 corresponding with cyan and yellow, respectively, which are relatively high in lightness and relatively low in visibility. Specifically, laser beam L4 corresponding with yellow, which is highest in lightness of the four colors used in color image formation, is caused to become incident on the polygonal mirror 6 at the widest incident angle. Further, a pair of mirrors 21A and 21B and a pair of mirrors 22A and 22B are positioned in respective ones of the optical paths of laser beams L1 and L2 corresponding with black and cyan, respectively, which become incident on the polygonal mirrors 6 from the upper side of the primary optical axis plane 6A, while a set of three mirrors 23A to 23C and a pair of mirrors 24A and 24B are positioned in respective ones of the optical paths of laser beams L3 and L4 corresponding with magenta and yellow, respectively, which become incident on the polygonal mirror 6 from the lower side of the primary optical axis plane 6A.

Figure 8B:
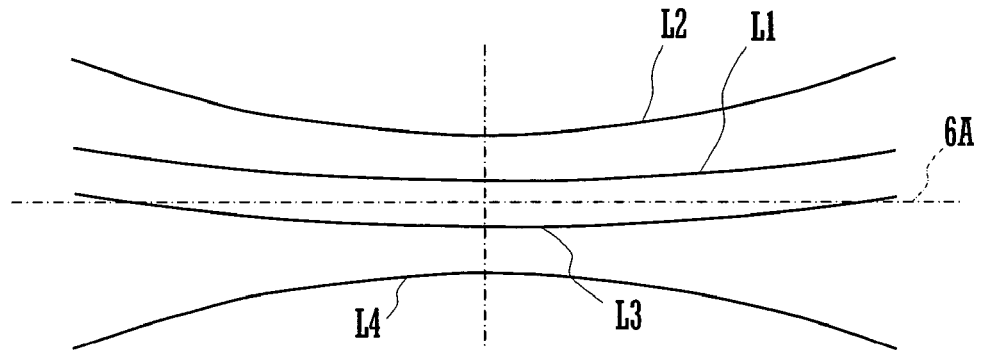
FIG. 8B is an illustration of curved states of respective laser beams passing from the mirrors in the third arrangement to respective photosensitive drums.

With this arrangement, laser beams L1 to L4 become curved so that laser beams L1 to L3 are curved to protrude downwardly and laser beam L4 curved to protrude upwardly with respect to the primary optical axis plane 6A, as shown in FIG. 8B. The relative scanning line positions of laser beams L1 to L4 on respective ones of the photosensitive drums 101A to 101D are made to coincide with each other at a central portion of the primary scanning axis by adjusting either the modulation start timing with which modulation of each of laser beams L1 to L4 according to the associated one of the image data items corresponding with the four colors is to be started or the positions of the mirrors (namely, mirrors 21A and 21B, mirrors 22A and 22B, mirrors 23A to 23C and mirrors 24A and 24B).

Figure 8C:
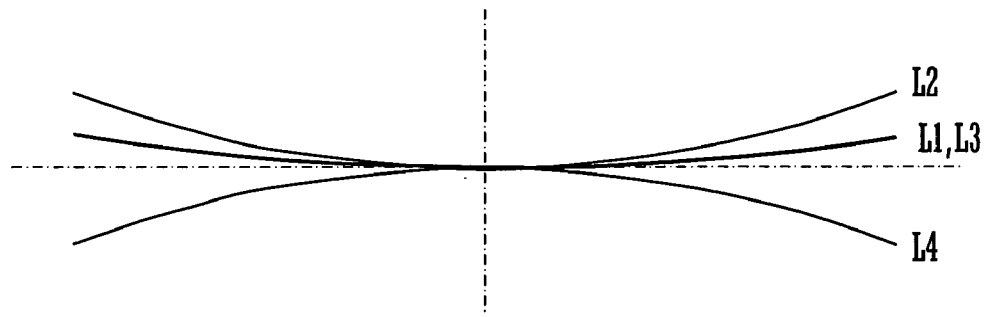
FIG. 8C is an illustration of a superimposed state of toner images formed on respective photosensitive drums by the laser beams having passed through the third arrangement of mirrors.

In this way, the relative scanning positions of laser beams L1 to L3 in the secondary scanning direction other than the scanning position of laser beam L4 corresponding with yellow, which is highest in lightness of the four colors, are brought closer to each other as shown in FIG. 8C; particularly, laser beams L1 and L3 corresponding with black and magenta, respectively, are superimposed on each other, whereby relative scanning position errors of laser beams L1 to L3 corresponding with respective high-visibility images can be minimized in the secondary scanning direction. In cases where cyan and magenta have little difference in lightness or where cyan is lower in lightness than magenta contrary to the present embodiment, an optical system may be formed in which laser beams L3 and L2 correspond with cyan and magenta, respectively.

Figure 9A:
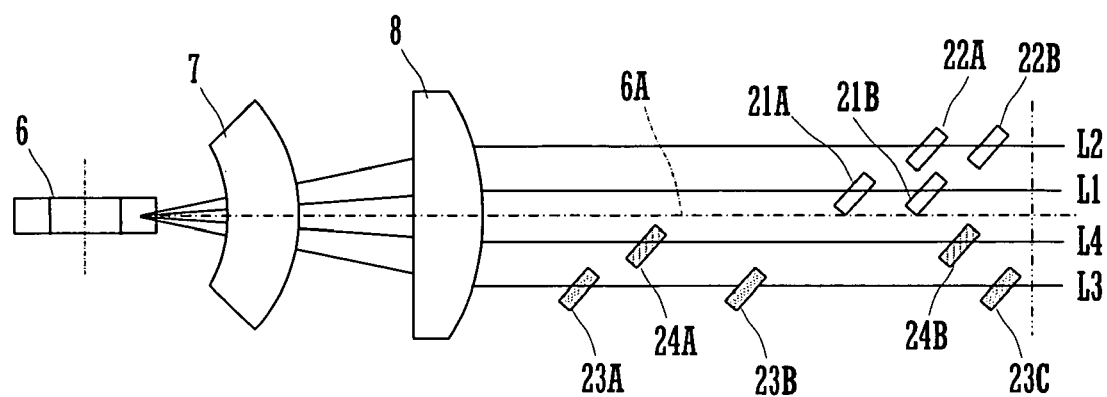
FIG. 9A is an illustration of a fourth arrangement of mirrors in a portion of optical paths of laser beams in the exposure unit.

In a fourth arrangement shown in FIG. 9A, laser beams L1 and L4 corresponding with black and yellow, respectively, are caused to become incident on a reflective surface of the polygonal mirror 6 at smaller incident angles than laser beams L2 and L3 corresponding with cyan and magenta, respectively. Further, a pair of mirrors 21A and 21B and a pair of mirrors 22A and 22B are positioned in respective ones of the optical paths of laser beams L1 and L2 corresponding with black and cyan, respectively, which become incident on the polygonal mirror 6 from the upper side of the primary optical axis plane 6A, while a set of three mirrors 23A to 23C and a pair of mirrors 24A and 24B are positioned in respective ones of the optical paths of laser beams L3 and L4 corresponding with magenta and yellow, respectively, which become incident on the polygonal mirror 6 from the lower side of the primary optical axis plane 6A.

Figure 9B:
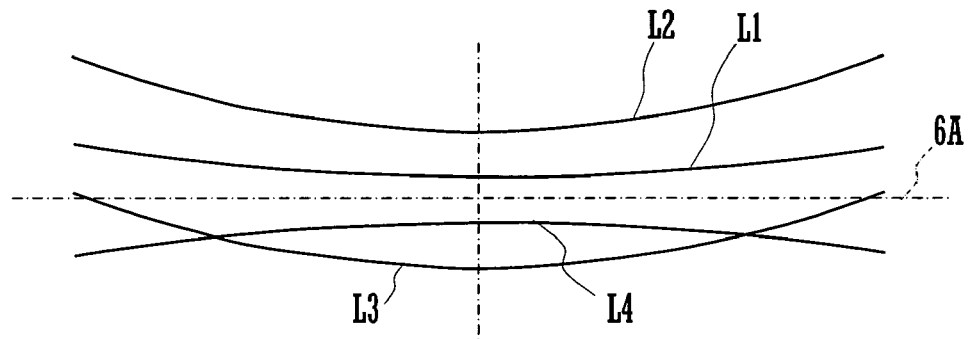
FIG. 9B is an illustration of curved states of respective laser beams passing from the mirrors in the fourth arrangement to respective photosensitive drums.

With this arrangement, laser beams L1 to L4 become curved so that laser beams L1 to L3 are curved to protrude downwardly and laser beam L4 curved to protrude upwardly with respect to the primary optical axis plane 6A, as shown in FIG. 9B. The relative scanning line positions of laser beams L1 to L4 on respective ones of the photosensitive drums 101A to 101D are made to coincide with each other at a central portion of the primary scanning axis by adjusting either the modulation start timing with which modulation of each of laser beams L1 to L4 according to the associated one of the image data items corresponding with the four colors is to be started or the positions of the mirrors (namely, mirrors 21A and 21B, mirrors 22A and 22B, mirrors 23A to 23C and mirrors 24A and 24B).

Figure 9C:
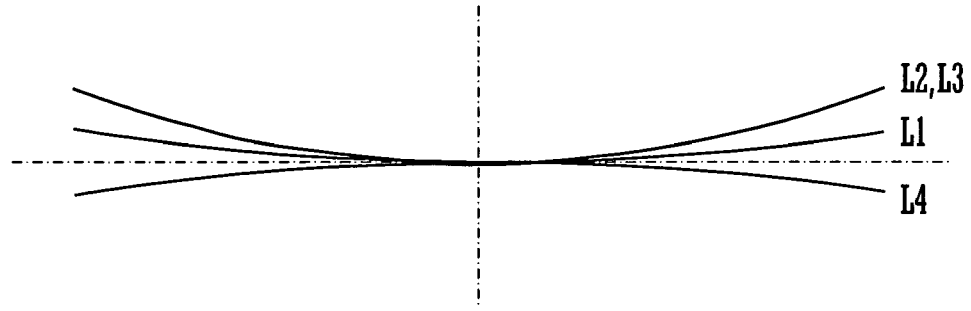
FIG. 9C is an illustration of a superimposed state of toner images formed on respective photosensitive drums by the laser beams having passed through the fourth arrangement of mirrors.

In this way, the relative scanning positions of laser beams L1 to L3 in the secondary scanning direction other than the scanning position of laser beam L4 corresponding with yellow, which is highest in lightness of the four colors, are brought closer to each other as shown in FIG. 9C; particularly, laser beams L2 and L3 corresponding with cyan and magenta, respectively, are superimposed on each other, whereby relative scanning position errors of laser beams L1 to L3 corresponding with respective high-visibility images can be minimized in the secondary scanning direction.

Figure 10A:
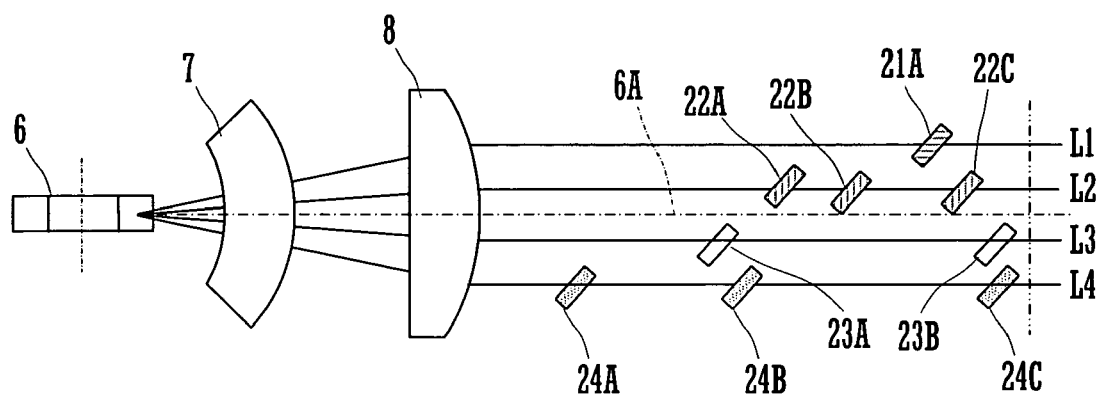
FIG. 10A is an illustration of a fifth arrangement of mirrors in a portion of optical paths of laser beams in the exposure unit.

In a fifth arrangement shown in FIG. 10A, laser beams L2 and L3 corresponding with cyan and magenta, respectively, are caused to become incident on a reflective surface of the polygonal mirror 6 at smaller incident angles than laser beams L1 and L4 corresponding with black and yellow, respectively. Further, one mirror 21 A and a set of three mirrors 22A to 22C are positioned in respective ones of the optical paths of laser beams L1 and L2 corresponding with black and cyan, respectively, which become incident on the polygonal mirror 6 from the upper side of the primary optical axis plane 6A, while a pair of mirrors 23A and 23B and a set of three mirrors 24A to 24C are positioned in respective ones of the optical paths of laser beams L3 and L4 corresponding with magenta and yellow, respectively, which become incident on the polygonal mirror 6 from the lower side of the primary optical axis plane 6A.

Figure 10B:
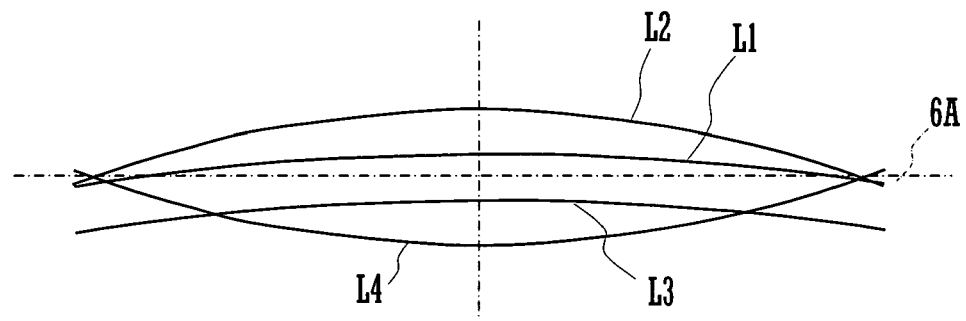
FIG. 10B is an illustration of curved states of respective laser beams passing from the mirrors in the fifth arrangement to respective photosensitive drums.

With this arrangement, laser beams L1 to L4 become curved so that laser beams L1 to L3 are curved to protrude upwardly and laser beam L4 curved to protrude downwardly with respect to the primary optical axis plane 6A, as shown in FIG. 10B. The relative scanning line positions of laser beams L1 to L4 on respective ones of the photosensitive drums 101A to 101D are made to coincide with each other at a central portion of the primary scanning axis by adjusting either the modulation start timing with which modulation of each of laser beams L1 to L4 according to the associated one of the image data items corresponding with the four colors is to be started or the positions of the mirrors (namely, mirror 21A, mirrors 22A to 22C, mirrors 23A and 23B and mirrors 24A to 24C).

Figure 10C:
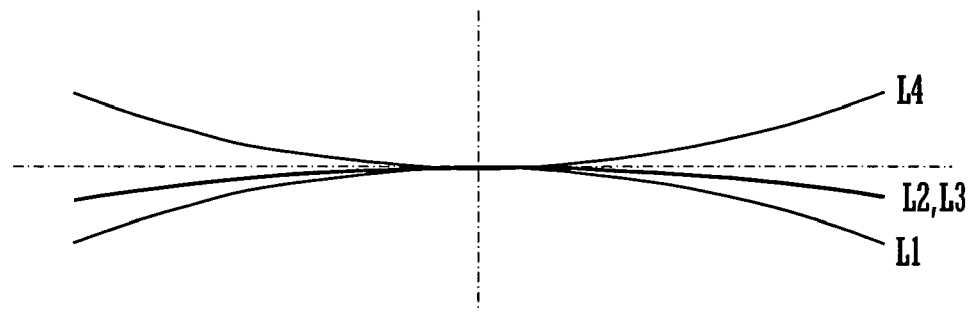
FIG. 10C is an illustration of a superimposed state of toner images formed on respective photosensitive drums by the laser beams having passed through the fifth arrangement of mirrors.

In this way, the relative scanning positions of laser beams L1 to L4 in the secondary scanning direction other than the scanning position of laser beam L4 corresponding with yellow, which is highest in lightness of the four colors, are brought closer to each other as shown in FIG. 10C; particularly, laser beams L2 and L3 corresponding with cyan and magenta, respectively, are superimposed on each other, whereby relative scanning position errors of laser beams L1 to L3 corresponding with respective high-visibility images can be minimized in the secondary scanning direction.

Figure 11A:
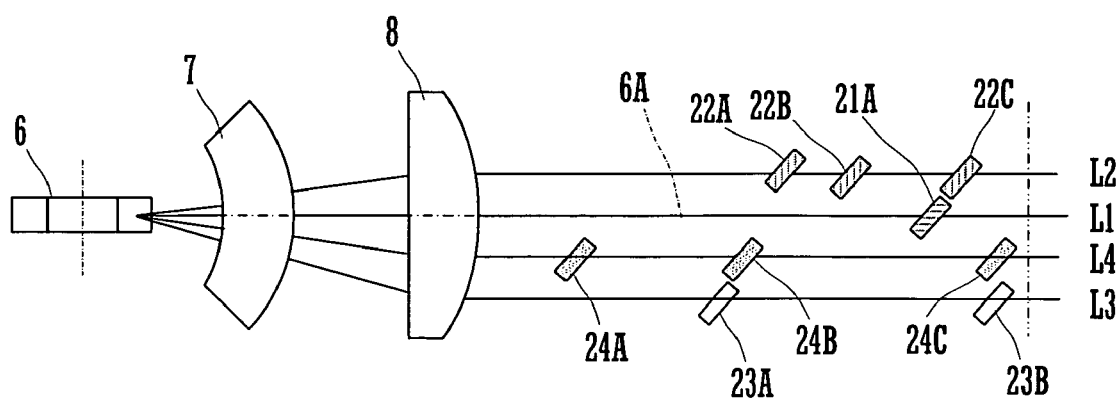
FIG. 11A is an illustration of a sixth arrangement of mirrors in a portion of optical paths of laser beams in the exposure unit.

In a sixth arrangement shown in FIG. 11A, laser beam L1 corresponding with black is caused to become incident on a reflective surface of the polygonal mirror 6 at an incident angle of 0°, while laser beams L2 and L4 corresponding with cyan and yellow, respectively, are caused to become incident on the reflective surface of the polygonal mirror 6 at smaller incident angles than laser beam L3 corresponding with magenta. Further, one mirror 21A is positioned in the optical path of laser beam L1 corresponding with black, a set of three mirrors 22A to 22C are positioned in the optical path of laser beam L2 corresponding with cyan which becomes incident on the polygonal mirror 6 from the upper side of the primary optical axis plane 6A, and a pair of mirrors 23A and 23B and a set of three mirrors 24A to 24C are positioned in respective ones of the optical paths of laser beams L3 and L4 corresponding with magenta and yellow, respectively, which become incident on the polygonal mirror 6 from the lower side of the primary optical axis plane 6A.

Figure 11B:
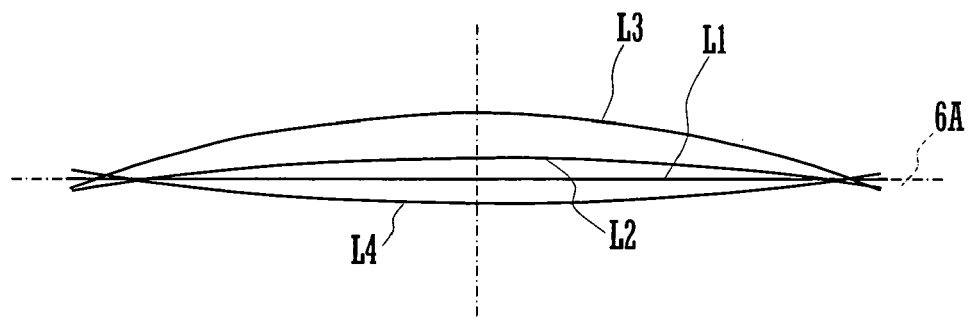
FIG. 11B is an illustration of curved states of respective laser beams passing from the mirrors in the sixth arrangement to respective photosensitive drums.

With this arrangement, laser beams L2 to L4 become curved so that laser beams L2 and L3 are curved to protrude upwardly and laser beam L4 curved to protrude downwardly with respect to laser beam L1 in the primary optical axis plane 6A, as shown in FIG. 11B. The relative scanning line positions of laser beams L1 to L4 on respective ones of the photosensitive drums 101A to 101D are made to coincide with each other at a central portion of the primary scanning axis by adjusting either the modulation start timing with which modulation of each of laser beams L1 to L4 according to the associated one of the image data items corresponding with the four colors is to be started or the positions of the mirrors (namely, mirror 21A, mirrors 22A to 22C, mirrors 23A and 23B and mirrors 24A to 24C).

Figure 11C:
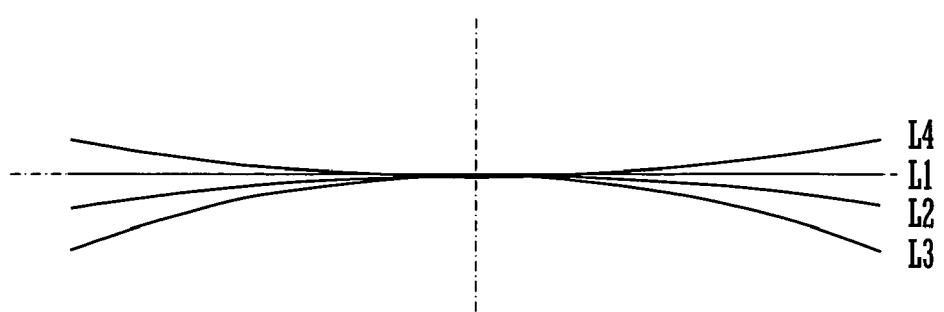
FIG. 11C is an illustration of a superimposed state of toner images formed on respective photosensitive drums by the laser beams having passed through the sixth arrangement of mirrors.

In this way, the relative scanning positions of laser beams L1 to L4 corresponding with respective ones of the four colors in the secondary scanning direction are brought closer to each other as shown in FIG. 11C, whereby relative scanning position errors of laser beams L1 to L4 can be reduced in the secondary scanning direction.

Figure 12A:
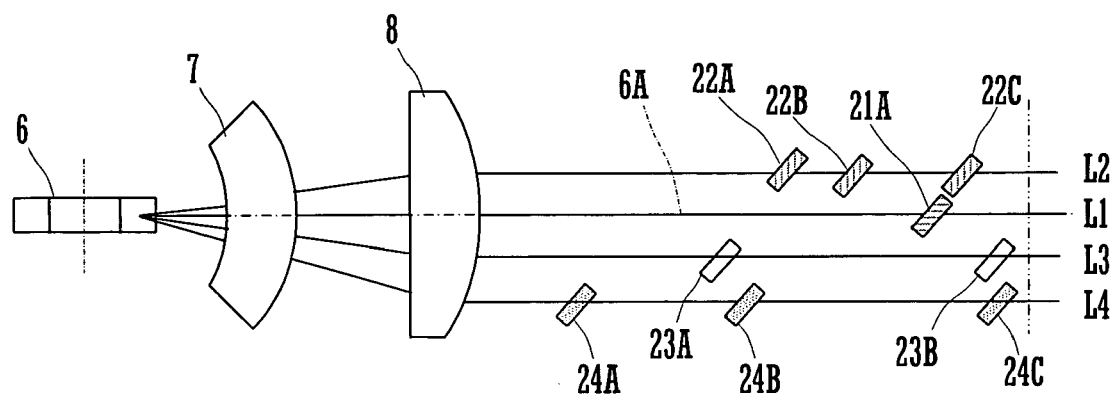
FIG. 12A is an illustration of a seventh arrangement of mirrors in a portion of optical paths of laser beams in the exposure unit.

In a seventh arrangement shown in FIG. 12A, laser beam L1 corresponding with black is caused to become incident on a reflective surface of the polygonal mirror 6 at an incident angle of 0°, while laser beams L2 and L3 corresponding with cyan and magenta, respectively, are caused to become incident on the reflective surface of the polygonal mirror 6 at smaller incident angles than laser beam L4 corresponding with yellow. Further, one mirror 21A is positioned in the optical path of laser beam L1 corresponding with black, a set of three mirrors 22A to 22C are positioned in the optical path of laser beams L2 corresponding with cyan which becomes incident on the polygonal mirror 6 from the upper side of the primary optical axis plane 6A, and a pair of mirrors 23A and 23B and a set of three mirrors 24A to 24C are positioned in respective ones of the optical paths of laser beams L3 and L4 corresponding with magenta and yellow, respectively, which become incident on the polygonal mirror 6 from the lower side of the primary optical axis plane 6A.

Figure 12B:
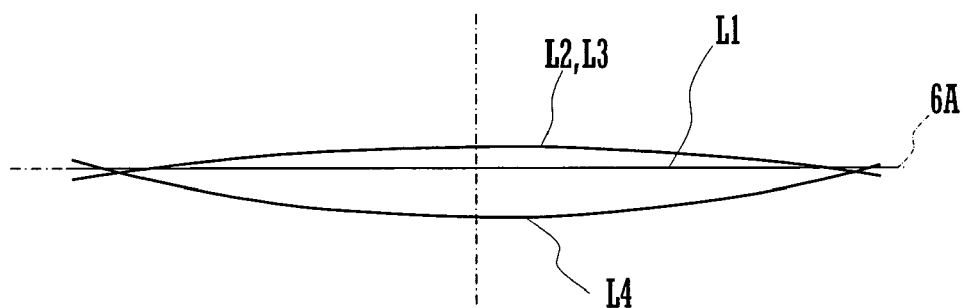
FIG. 12B is an illustration of curved states of respective laser beams passing from the mirrors in the seventh arrangement to respective photosensitive drums.

With this arrangement, laser beams L2 to L4 become curved so that laser beams L2 and L3 are curved to protrude upwardly and laser beam L4 curved to protrude downwardly with respect to laser beam L1 in the primary optical axis plane 6A, as shown in FIG. 12B. The relative scanning line positions of laser beams L1 to L4 on respective ones of the photosensitive drums 101A to 101D are made to coincide with each other at a central portion of the primary scanning axis by adjusting either the modulation start timing with which modulation of each of laser beams L1 to L4 according to the associated one of the image data items corresponding with the four colors is to be started or the positions of the mirrors (namely, mirror 21A, mirrors 22A to 22C, mirrors 23A and 23B and mirrors 24A to 24C).

Figure 12C:
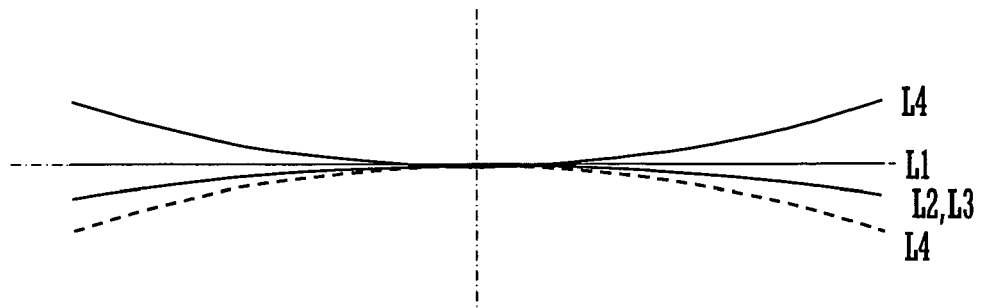
FIG. 12C is an illustration of a superimposed state of toner images formed on respective photosensitive drums by the laser beams having passed through the seventh arrangement of mirrors.

In this way, the relative scanning positions of laser beams L2 and L3 in the secondary scanning direction are made to coincide with each other and brought closer to the relative scanning position of laser beam L1 as shown in FIG. 12C, whereby relative scanning position errors of laser beams L1 to L3 corresponding, respectively, with the three colors other than yellow, which is highest in lightness and lowest in visibility of the four colors used in color image formation, can be minimized in the secondary scanning direction. If an even number of mirrors, such as two or four mirrors, are positioned in the optical path of laser beam L4 instead of the set of three mirrors, it is possible to allow the laser beam to be curved as depicted by broken line L4' thereby to further reduce relative scanning position errors of all the laser beams in the secondary scanning direction.

In any one of the above-described arrangements shown in FIGS. 6 to 12, the relative scanning line positions of laser beams L1 to L4 on respective ones of the photosensitive drums 101A to 101D are made to coincide with each other at a central portion of the primary scanning axis by adjusting either the modulation start timing with which modulation of each of laser beams L1 to L4 according to the associated one of the image data items corresponding with the four colors is to be started or the positions of the mirrors 21 to 24. The relative scanning line positions of laser beams L1 to L4 may be made to coincide with each other at other portions of the primary scanning axis than the central portion depending on the optical characteristics of the lenses 7 to 9.

In each of the arrangements shown in FIGS. 11 and 12, laser beam L1 corresponding with black, which is lowest in lightness and highest in visibility of the four colors used in color image formation, is a light beam becoming incident on the reflective surface of the polygonal mirror 6 at the smallest incident angle.

In the arrangement shown in FIG. 12, the laser beams except laser beam L4 corresponding with yellow, which is highest in lightness and lowest in visibility of the four colors used in color image formation, are light beams other than a light beam becoming incident on the reflective surface of the polygonal mirror 6 at the widest incident angle.

In each of the arrangements shown in FIGS. 6 and 8 to 12, each of the separating members defined by the present invention comprises a single or plural mirrors and the difference in number between the mirrors arranged to separate at least one laser beam incident on the polygonal mirror 6 from one side of the primary optical axis plane 6A of the polygonal mirror 6 and the mirrors arranged to separate at least one laser beam becoming incident on the polygonal mirror 6 from the other side of the primary optical axis plane 6A is an odd number.

Figure 13:
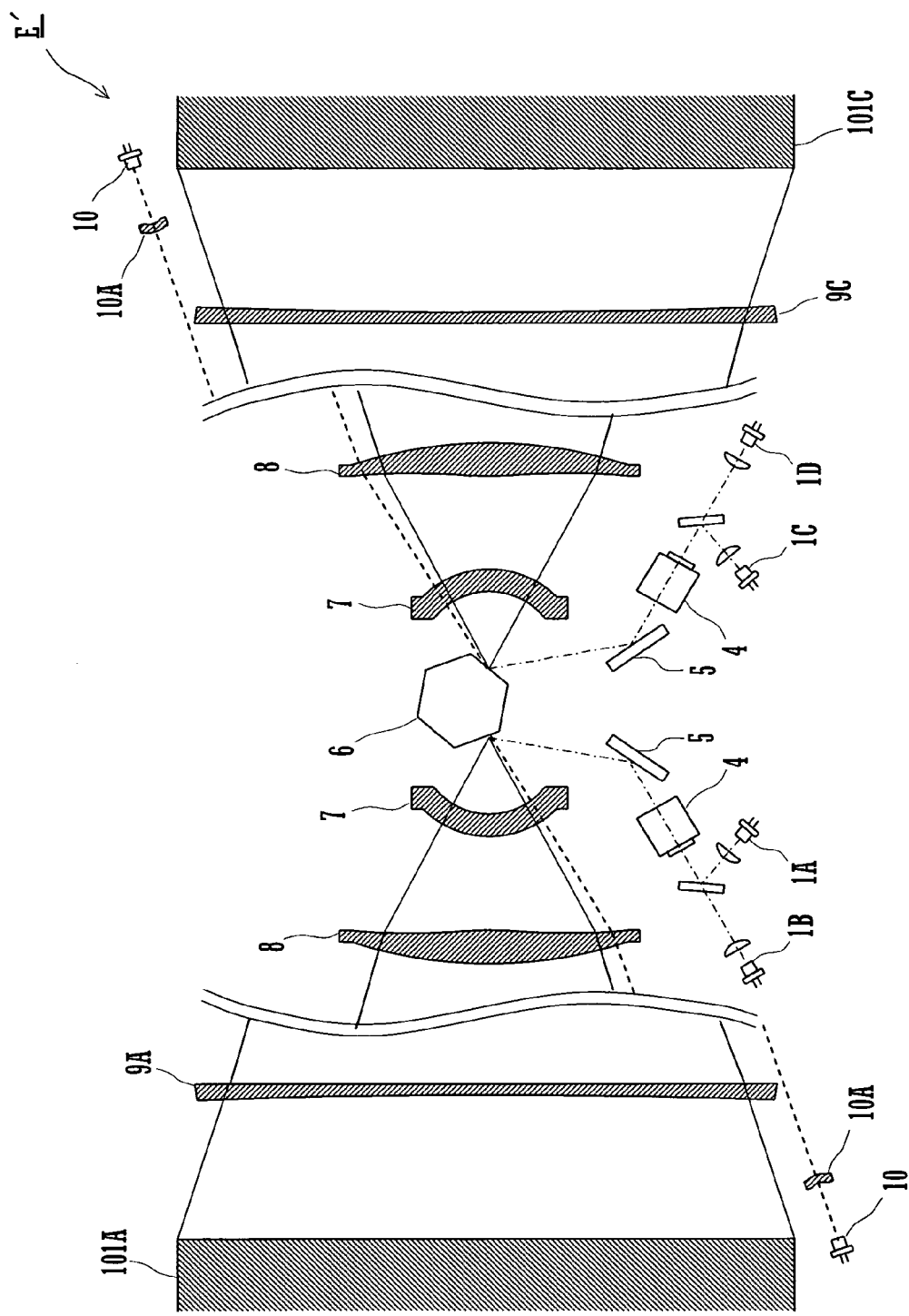
FIG. 13 is a schematic plan view showing the structure of an exposure unit as a light beam scanner according to another embodiment of the present invention.

FIG. 13 is a schematic plan view showing the structure of an exposure unit as a light beam scanner according to another embodiment of the present invention. In FIG. 13, only second cylindrical lenses 9A and 9C and photosensitive drums 101A and 101C are shown. Though not shown, second cylindrical lens 9B and photosensitive drum 101B are disposed on the same side as the second cylindrical lens 9A and photosensitive drum 101A, while second cylindrical lens 9D and photosensitive drum 101D are disposed on the same side as the second cylindrical lens 9C and photosensitive drum 10C.

The exposure unit E' according to the present embodiment includes a single polygonal mirror 6, a pair of Fθ lenses 7,7 and a pair of lenses of Fθ lenses 8,8. This structure simply has to have a space allowing two semiconductor lasers to be disposed therein along the axis of rotation of the polygonal mirror 6 and, hence, the exposure unit E' can be downsized along the axis of rotation of the polygonal mirror 6.

While the foregoing description has been made of color image formation using all the image forming sections PA to PD, monochromatic image formation using only the black image forming section PA is also possible. In this case a monochromatic image of high quality with less and inconspicuous bow distortion can be formed since each of the foregoing embodiments is configured so that the scanning line of laser beam L1 forming a black image has the smallest bow distortion.

The black image forming section PA is constantly used whether in monochromatic image formation or in color image formation and hence is used most frequently. Since the laser beam applied to the black image forming section for most frequent use forms a scanning line having the smallest bow distortion, high-quality image formation can be realized constantly.

While the foregoing description has been made of the image forming apparatus using developers (color materials) of the four colors, i.e., yellow, magenta, cyan and black, to obtain a full-color image as an embodiment of the present invention, it is needless to say that the present invention is applicable to an image forming apparatus using color materials of colors other than the four colors or using a different number of color materials than four.

The foregoing embodiments are illustrative in all points and should not be construed to limit the present invention. The scope of the present invention is defined not by the foregoing embodiment but by the following claims. Further, the scope of the present invention is intended to include all modifications within the meanings and scopes of claims and equivalents.

What is claimed is:

1. A light beam scanner comprising:
a plurality of image carriers;
a deflecting member configured to deflect plural light beams at constant angular velocity by rotation of a reflective surface of the deflecting member, the plural light beams being incident on the reflective surface at different incident angles in a secondary scanning direction perpendicular to a primary scanning direction that is parallel with axes of the image carriers, the plural light beams corresponding with respective images formed of respective color materials which are different in lightness from each other;

a transformation member configured to deflect the plural light beams thus deflected by the deflecting member so that each of the plural light beams deflected by the transformation member scans a surface of an associated one of the image carriers at a constant velocity in the primary scanning direction; and separating members arranged to separate the plural light beams thus deflected by the transformation member from each other in respective directions toward the surfaces of the respective image carriers, wherein any one of the plural light beams, except a light beam incident on the deflecting member at a widest incident angle of the different incident angles in the secondary scanning direction, corresponds with an image formed of a color material which is lowest in lightness of the color materials.

2. A light beam scanner comprising:

a plurality of image carriers;

a deflecting member configured to deflect plural light beams at constant angular velocity by rotation of a reflective surface of the deflecting member, the plural light beams being incident on the reflective surface at different incident angles in a secondary scanning direction perpendicular to a primary scanning direction that is parallel with axes of the image carriers, the plural light beams corresponding with respective images formed of respective color materials which are different in lightness from each other;

a transformation member configured to deflect the plural light beams thus deflected by the deflecting member so that each of the plural light beams deflected by the transformation member scans a surface of an associated one of the image carriers at a constant velocity in the primary scanning direction; and separating members arranged to separate the plural light beams thus deflected by the transformation member from each other in respective directions toward the surfaces of the respective image carriers, wherein the plural light beams include a first light beam corresponding with an image formed of a color material, and a second light beam corresponding with another image formed of a color material which is lower in lightness than the color material corresponding with the first light beam, the second light beam being any one of light beams incident on the deflecting member at incident angles, in the secondary scanning direction, which is smaller than the incident angle of the first light beam in the secondary scanning direction.

3. A light beam scanner comprising:

a plurality of image carriers;

a deflecting member configured to deflect plural light beams at constant angular velocity by rotation of a reflective surface of the deflecting member, the plural light beams being incident on the reflective surface at different incident angles in a secondary scanning direction perpendicular to a primary scanning direction that is parallel with axes of image carriers, the plural light beams corresponding with respective of images formed of respective color materials which are different in lightness from each other;

a transformation member configured to deflect the plural light beams thus deflected by the deflecting member so that each of the plural light beams deflected by the transformation member scans a surface of an associated one of the image carriers at a constant velocity in the primary scanning direction; and separating members arranged to separate the plural light beams thus deflected by the transformation member from each other in respective directions toward the surfaces of the respective image carriers, wherein the plural light beams, except a light beam corresponding with an image formed of a color material which is highest in lightness of the color materials, are light beams other than a light beam which is incident on the deflecting member at a widest incident angle of the different incident angles in the secondary scanning direction.

4. An image forming apparatus comprising:

plural image carriers configured to be scanned with respective of plural light beams corresponding with respective images formed of respective color materials which are different in lightness from each other; and a light beam scanner comprising:

a deflecting member configured to deflect the plural light beams at constant angular velocity by rotation of a reflective surface of the deflecting member, the plural light beams being incident on the reflective surface at different incident angles in a secondary scanning direction perpendicular to a primary scanning direction that is parallel with axes of the image carriers, the plural light beams corresponding with respective of images formed of respective color materials which are different in lightness from each other;

a transformation member configured to deflect the plural light beams thus deflected by the deflecting member so that each of the plural light beams deflected by the transformation member scans a surface of an associated one of the image carriers at a constant velocity in the primary scanning direction; and separating members arranged to separate the plural light beams thus deflected by the transformation member from each other in respective directions toward the surfaces of the respective image carriers, wherein any one of the plural light beams, except a light beam incident on the deflecting member at a widest incident angle of the different incident angles in the secondary scanning direction, corresponds with an image formed of a color material which is lowest in lightness of the color materials.

5. The image forming apparatus according to claim 4, wherein the plural image carriers include a yellow image carrier which is configured to carry an image formed of a yellow color material thereon and to be scanned with the light beam incident on the deflecting member at the widest incident angle in the secondary scanning direction.

6. The image forming apparatus according to claim 4, wherein the plural image carriers include a black image carrier which is configured to carry an image formed of a black color material thereon and to be scanned with a light beam incident on the deflecting member at a smallest incident angle of the different incident angles in the secondary scanning direction.

7. The image forming apparatus according to claim 4, wherein the plural image carriers include a yellow image carrier which is configured to carry an image formed of a yellow color material thereon and to be scanned with the light beam incident on the deflecting member at the widest incident angle in the secondary scanning direction, and a black image carrier which is configured to carry an image formed of a black color material thereon and to be scanned with a light beam incident on the deflecting member at a smallest incident angle of the different incident angles in the secondary scanning direction.

* * * * *